US008060740B2

(12) United States Patent
Yoon et al.

(10) Patent No.: US 8,060,740 B2
(45) Date of Patent: Nov. 15, 2011

(54) AUTHENTICATION SYSTEM AND METHOD FOR AN INTERACTIVE OPTICAL DISC

(75) Inventors: Woo Seong Yoon, Seoul (KR); Yong Hoon Choi, Seoul (KR); Jea Yong Yoo, Seoul (KR); Limonov Alexandre, Seoul (KR)

(73) Assignee: LG Electronics Inc., Seoul (KR)

( * ) Notice: Subject to any disclaimer, the term of this patent is extended or adjusted under 35 U.S.C. 154(b) by 873 days.

(21) Appl. No.: 10/838,663

(22) Filed: May 3, 2004

(65) Prior Publication Data
US 2004/0218900 A1 Nov. 4, 2004

(30) Foreign Application Priority Data
May 2, 2003 (KR) .................. 10-2003-0028213

(51) Int. Cl.
*H04L 9/12* (2006.01)
(52) U.S. Cl. .......... 713/155; 713/169; 713/189; 726/26; 726/27
(58) Field of Classification Search .................... 713/155
See application file for complete search history.

(56) References Cited

U.S. PATENT DOCUMENTS

| 5,138,712 | A | * | 8/1992 | Corbin | 726/30 |
| 6,009,401 | A | * | 12/1999 | Horstmann | 705/1 |
| 6,034,618 | A | * | 3/2000 | Tatebayashi et al. | 340/5.8 |
| 6,047,376 | A | | 4/2000 | Hosoe | |
| 6,453,420 | B1 | * | 9/2002 | Collart | 726/26 |
| 6,580,870 | B1 | | 6/2003 | Kanazawa et al. | |
| 6,754,155 | B1 | | 6/2004 | Hayashi et al. | |
| 6,944,621 | B1 | * | 9/2005 | Collart | 707/102 |
| 7,003,674 | B1 | * | 2/2006 | Hamlin | 713/193 |
| 7,020,778 | B1 | * | 3/2006 | Miettinen et al. | 713/182 |
| 7,260,719 | B1 | * | 8/2007 | Asano et al. | 713/169 |
| 7,487,225 | B2 | * | 2/2009 | Nishibe et al. | 709/219 |
| 7,596,579 | B2 | * | 9/2009 | Jung et al. | 1/1 |
| 2001/0031066 | A1 | * | 10/2001 | Meyer et al. | 382/100 |
| 2001/0036360 | A1 | * | 11/2001 | Sogabe et al. | 386/125 |
| 2002/0078181 | A1 | * | 6/2002 | Treffers et al. | 709/219 |
| 2002/0093750 | A1 | * | 7/2002 | Hayami et al. | 360/29 |
| 2002/0103855 | A1 | * | 8/2002 | Chatani | 709/203 |
| 2002/0120722 | A1 | | 8/2002 | Kutaragi et al. | |
| 2002/0188566 | A1 | * | 12/2002 | Inchalik et al. | 705/44 |
| 2003/0018751 | A1 | * | 1/2003 | Lee et al. | 709/219 |
| 2003/0028892 | A1 | * | 2/2003 | Gewickey et al. | 725/110 |
| 2003/0070096 | A1 | * | 4/2003 | Pazi et al. | 713/201 |
| 2003/0072447 | A1 | * | 4/2003 | Saliahov | 380/229 |
| 2004/0030650 | A1 | * | 2/2004 | Okuyama et al. | 705/50 |
| 2004/0179822 | A1 | * | 9/2004 | Tsumagari et al. | 386/96 |
| 2004/0234245 | A1 | * | 11/2004 | Jung et al. | 386/95 |
| 2005/0144465 | A1 | * | 6/2005 | Senshu | 713/189 |
| 2006/0277607 | A1 | * | 12/2006 | Chung | 726/27 |

FOREIGN PATENT DOCUMENTS
EP     713334 A2 *  5/1996
(Continued)

OTHER PUBLICATIONS
Park, J. S. et al., "Secure cookies on the Web", IEEE Internet Computing, New York, NY, Jul. 1, 2000, pp. 36-44, XP-002190888.

*Primary Examiner* — Kambiz Zand
*Assistant Examiner* — Yonas Bayou
(74) *Attorney, Agent, or Firm* — Birch, Stewart, Kolasch & Birch, LLP (57) ABSTRACT

A method for authenticating an interactive optical disk, wherein first content is stored on the interactive optical disk for reproduction by a reproducing system, the method comprising: transmitting a first request to a content server to access second content from the content server based on enhanced navigation data recorded on the interactive optical disk; and authenticating identity of the interactive optical disk with the content server based on authentication data provided by the reproducing system, when the first request indicates that authentication is required.

29 Claims, 4 Drawing Sheets

FOREIGN PATENT DOCUMENTS

| | | | |
|---|---|---|---|
| EP | 929025 A1 * | 7/1999 |
| EP | 1 389 777 A2 | 2/2004 |
| GB | 2306044 A * | 4/1997 |
| GB | 2306754 A * | 5/1997 |
| GB | 2329509 A * | 3/1999 |
| GB | 2 362 749 A | 11/2001 |
| JP | 10-177554 A | 6/1998 |
| JP | 11-225324 A | 8/1999 |
| JP | 2001-52429 A | 2/2001 |
| JP | 2001-256004 | 9/2001 |
| JP | 2003-100013 | 4/2003 |
| JP | 2003-249057 | 9/2003 |
| WO | WO-02/067125 A1 | 8/2002 |

* cited by examiner

AUTHENTICATION SYSTEM AND METHOD FOR AN INTERACTIVE OPTICAL DISC

CROSS-REFERENCE TO RELATED APPLICATIONS

Pursuant to 35 U.S.C. §119(a), this application claims the benefit of earlier filing date and right of priority to the Korean Patent Application No. 2003-028213, filed on May 2, 2003, the content of which is hereby incorporated by reference in its entirety.

BACKGROUND OF THE INVENTION

1. Field of the Invention

The present invention relates to a method for authenticating an interactive recording medium such as an interactive DVD (IDVD) or an enhanced navigation DVD (ENAV DVD).

2. Description of the Related Art

High-density optical disks capable of recording large amounts of data are being widely used. The Digital Versatile Disc (DVD), which is a recording medium that is capable of recording large amounts of high-quality video data as well as digital audio data, is one example of these high-density optical disks.

Interactive optical disk such as IDVDs and ENAV DVDs are now under development. An interactive optical disk stores various ENAV applications such as characters, other movies, animations, or dubbed audio related to the main A/V stream that is being reproduced and thus allows a user to select and reproduce an ENAV application along with the main A/V stream. The ENAV DVD comprises a DVD video zone storing main A/V data and other zones storing ENAV applications data related to the main A/V data.

An optical disk player capable of playing ENAV DVDs comprises a DVD playback engine for reproducing the main A/V stream and an ENAV engine for reproducing the ENAV applications in synchronization with the main A/V stream and for controlling the DVD playback engine from time to time. If an ordinary DVD is loaded into the ENAV DVD player, the main A/V stream recorded thereon is reproduced only by the DVD playback engine. If an ENAV DVD is loaded, the main A/V stream and relevant ENAV applications are reproduced by the interaction of the DVD playback engine and the ENAV engine.

The ENAV DVD player is expected to be able to utilize various contents data in addition to the ENAV applications data recorded on an ENAV DVD by connecting to a remote contents server through the Network and downloading contents data relevant to the ENAV DVD, which extends the range of application services of the ENAV DVD and helps overcome the limit of disk capacity.

Due to the advent of new rewritable recording media such as DVD-R, DVD-RW, DVD+RW, and DVD-RAM, ENAV DVDs are exposed to illegal copying of contents. Also, concern about attempts to copy the contents of ENAV DVDs to hard disk drives is increasing.

In case of an ordinary DVD, the DVD player is required to judge whether the DVD is an illegal copy. In case of an ENAV DVD, not only the DVD player but the server to which the DVD player attempts to connect is required to authenticate the ENAV DVD inserted into the DVD player.

Contents providers, who provide through the network contents data needed for reproducing ENAV applications recorded on ENAV DVDs, want to examine whether clients attempting to access their contents servers to download contents data (e.g., users of ENAV DVD players or PCs having ENAV DVD drives installed therein) use authenticated DVDs or illegal copies. A contents server, therefore, will allow a client to access it only when the client's ENAV DVD is a genuine product and block the access if the client's ENAV DVD turns out to be an illegal copy.

Methods for determining whether a recording medium inserted into an ENAV DVD player attempting to access a remote server that provides contents data is a genuine product are under discussion. In general, a disk player attempting to access a remote server is requested to transmit to the server the ENAV disk ID (hereinafter referred to as ENAV DiskID) or the signature of sector raw data (hereinafter referred to as SSRD) of the disk loaded into the player.

Such authentication methods, in particular, specific authentication procedures needed between a disk player and a contents server are required. However, an effective solution or standard is not yet available.

In order to judge whether an ENAV DVD loaded into the ENAV DVD player attempting to access the contents server is a genuine product, the contents server requests that the ENAV DVD player provide information on the ENAV DVD, i.e., ENAV DiskID or SSRD corresponding to a particular logical sector number (hereinafter referred to as LSN) of the ENAV DVD specified by the contents server.

The ENAV DiskID is commonly recorded at an initial position that can be accessed first when the disk is inserted into the disk player for reproduction. The server-specified LSN may be arbitrary in the data area of the disk.

If the disk authentication is requested before the reproduction of the main A/V stream or ENAV applications begins, it is no problem to move the optical pickup of the disk player to a position from which the authentication data can be obtained. However, if the disk authentication is requested in the middle of the reproduction of the main A/V stream or ENAV applications, the movement of the optical pickup for obtaining the authentication data causes the reproduction to stop temporarily.

Even in the middle of the reproduction of the main A/V stream or ENAV applications, the disk player may connect to the server to obtain required contents data according to the viewer's request. In this case, the viewer may tolerate the suspension of the reproduction caused by the attempt to obtain the authentication data because he/she made the request.

On the other hand, while the main A/V stream or an ENAV application is being reproduced or after the reproduction of an ENAV application is completed, contents data for a next ENAV application may be required. In this case, the disk player attempts to connect to the contents server to obtain the required data, which makes the reproduction of the main A/V stream stop temporarily. This situation is not what the viewer can expect and prepare for and thus may frustrate the viewer.

Whether the main A/V stream or ENAV applications can be reproduced seamlessly depends on various factors, such as when the contents sever performs the authentication process, the authentication data type that the contents server requests from the disk player, and whether the authentication process is performed on a server basis or on a universal resource identifier (hereinafter referred to as URI) basis. The URI represents the individual position of each of the stored contents data file within the server.

For a stable and seamless playback of the main A/V stream or ENAV applications, a new method for authenticating an ENAV DVD to be performed by the contents server and the disk player is required.

SUMMARY OF THE INVENTION

A method for authenticating an interactive optical disk 10 wherein first content is stored on the interactive optical disk 10 for reproduction by a reproducing system is provided. The method comprises transmitting a first request to a content server to access second content from the content server based on enhanced navigation data recorded on the interactive optical disk 10; and authenticating identity of the interactive optical disk 10 with the content server based on authentication data provided by the reproducing system, when the first request indicates that authentication is required.

The authentication data is recorded on the interactive optical disk 10 and comprises a disk ID. In one embodiment, the authentication data is loaded in memory of the reproducing system, prior to transmitting the first request to avoid delay associated with reading the authentication data from the interactive optical disk 10. The authentication data can be stored in form of a cookie.

The method further comprises receiving second content from the content server when authentication is successful, discontinuing reproducing the first content, if authentication is unsuccessful, and interrupting reproducing the first content during authentication. In one embodiment, the first content comprises audiovisual data.

The above authenticating step comprises forwarding authentication data to the content server, or receiving authorization from the content server for the reproducing system to access requested second content, when the authentication data is verified by the content server. In one embodiment, the authenticating step further comprises receiving a challenge from the content server for the reproducing system to provide additional identifying data to the content server for authentication.

In one embodiment, the challenge is generated by the content server based on the authentication data provided by the reproducing system. The challenge comprises a logic sector number. The logic sector number refers to a storage area on the interactive optical disk 10 where the additional identifying data is recorded. The challenge can be generated in form of a cookie.

The identifying data can be retrieved from the interactive optical disk 10 based on information included in the challenge and converted to second authentication data based on a hash function; and forwarding the second authentication data to the content server. The identifying data is then forwarded to the content server for authentication.

The content server verifies the identifying data against database records to determine whether the interactive optical disk 10 is authentic. The content server authorizes the reproducing system to access the second content, when the identification data is verified by the content server. The reproducing system discontinues producing the first content, until the content server verifies the identifying data. In one embodiment, the authenticating step is performed for each content server accessed by the reproducing system or the authenticating step is performed for each content file recorded on the interactive optical disk 10, at time of reproduction.

In one embodiment, the authenticating step is not performed, when the first request comprises a first indicator indicating that authentication is not required. In other embodiments, the authenticating step is performed based on a first authentication data stored on the interactive optical disk 10 player, when the first request comprises a second indicator indicating that authentication is required.

In yet another embodiment, the authenticating step is performed based on a second authentication data calculated based on information provided by the content server, when the first request comprises a third indicator indicating that authentication is required. Once the authenticating step is successful, then the authenticating step is no longer performed when the reproducing system requests access to the second content stored on content servers listed in a list of content providers.

In another embodiment, when the authenticating step is successful, then the authenticating step is no longer performed when the reproducing system requests access to the second content accessible through an identified uniform resource locator.

In accordance with one embodiment, a method for authenticating an interactive optical disk 10, wherein first content is stored on the interactive optical disk 10 for reproduction by a reproducing system, is provided. The method comprises receiving a first request from a reproducing system to access second content based on enhanced navigation data recorded on the interactive optical disk 10; and authenticating identity of the interactive optical disk 10 based on authentication data provided by the reproducing system, when the first request indicates that authentication is required.

In accordance with a preferred embodiment, an optical medium configured for recording first content is provided, wherein the first content is reproducible by an enhanced content player capable of communicating with a content server for retrieving second content. The optical medium comprises first authentication data for identifying the optical medium, wherein the first authentication data is forward from the enhanced content player to the content server for authentication, when a request is provided for accessing the second content stored on the content server.

The optical medium may also comprise second authentication data recorded in a predefined portion of the optical medium. The predefined portion is identifiable according to information provided to the enhanced content player from the content server, in exchange for the enhanced content player forwarding the first authentication data to the content server. The predefined portion is a sector formatted on the optical medium. The information provided to the enhanced content player is a logic sector number (LSN) identifying the predefined portion. The authentication data is approximately 2048 bytes, in one embodiment.

According to another embodiment of the invention, a reproduction system for authenticating a storage medium, such as interactive DVD comprises a pickup device for reading content data (for example, A/V Data) and first authentication data (Disk ID) stored in the storage medium; an engine device for reproducing the content data from the storage medium; a controller in communication with and controlling the engine device; and an interface device controlled by the controller to communicate with an external device (for example, a CP server). The reproduction system transmits the first authentication data to the external device through the interface device to communicate with the external device, and receives a supplemental request from the external device is the first authentication data is authenticated by the external device.

According to one aspect of the invention, the controller receives the supplemental request that is associated with generating second authentication data (SSRD), and communicates the second authentication data to the external device through the interface device for further authentication by the external device. The controller preferably generates the second authentication data by hashing data associated with the supplemental request.

According to another embodiment of the invention, a server in communication with a reproduction system for authenticating a storage medium being played in the reproduction system, comprises means for receiving first authentication data from the reproduction system to communicate with the server; means for authenticating the first authentication data with first information stored in the server; means for communicating a supplemental request to the reproduction system to receive second authentication data that is generated by using the supplemental request when the first authentication data is authenticated; and means for authenticating the second authentication data with second information stored in the server.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

DETAILED DESCRIPTION OF THE PREFERRED EMBODIMENTS

In order that the invention may be fully understood, preferred embodiments thereof will now be described with reference to the accompanying drawings.

Figure 1:
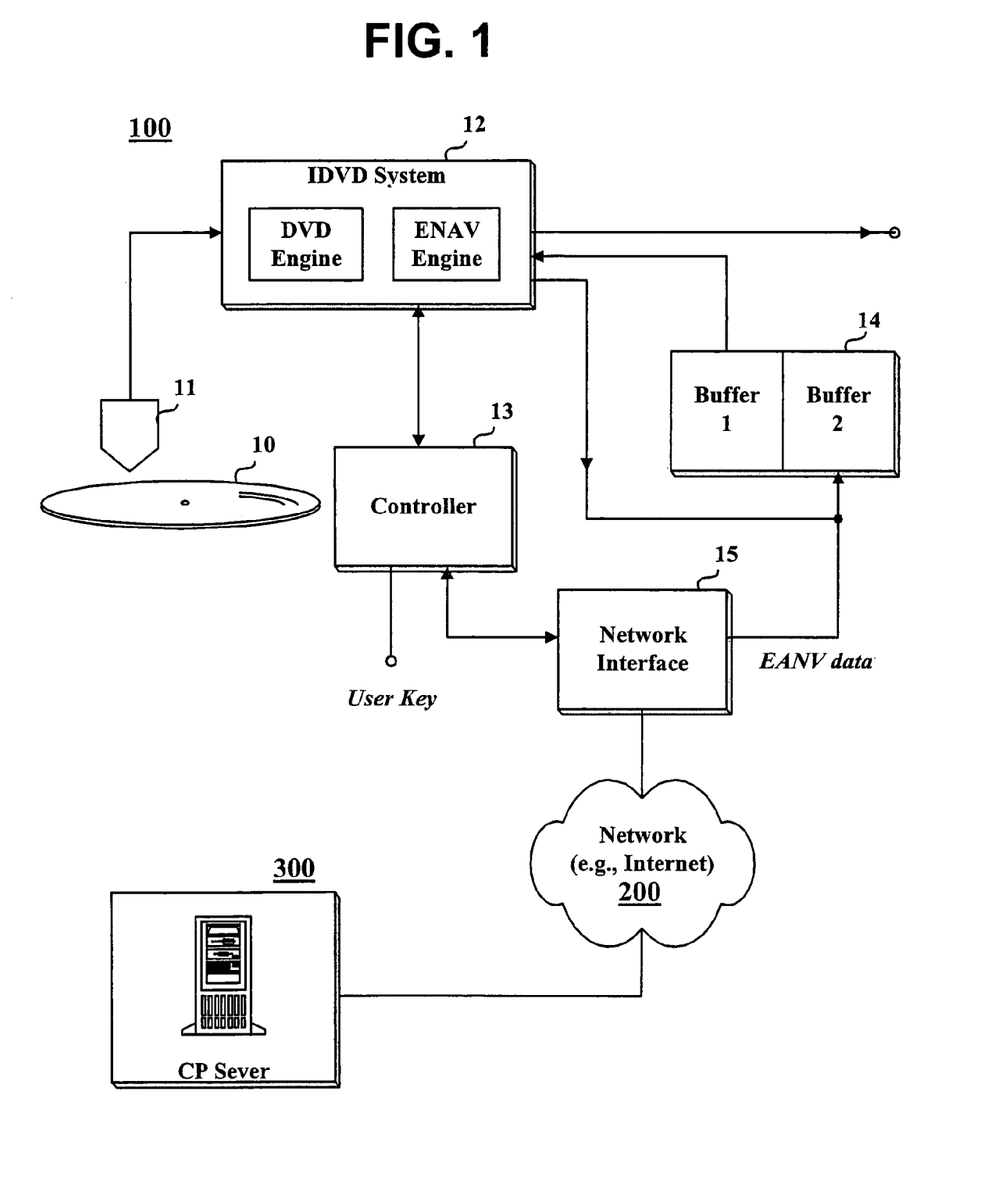
FIG. 1 illustrates a schematic diagram of an interactive optical disk 10 reproducing apparatus 100 according to a preferred embodiment of the present invention.

Referring to FIG. 1, an optical disk reproducing system or apparatus 100 (i.e., an interactive optical disk player) comprises an optical pickup 11, an IDVD system 12, a microcontroller 13, a buffer memory 14, and a network interface 15 to connect to a content server (also referred to as a CP server) 300 through the network interface 15.

The IDVD system 12 comprises a DVD playback engine for reproducing the main A/V stream received from an interactive DVD 10 and an ENAV engine for reproducing ENAV applications received from the interactive DVD or the contents provided by the CP server 300.

The IDVD system 12 outputs a main A/V stream in synchronization with contents data, both read from the interactive DVD 10. Controlled by the microcontroller 13 and the ENAV engine included in the IDVD system 12, the network interface 15 connects to the CP server 300 through the network 200 as shown in FIG. 1.

The buffer memory 14 temporarily stores the ENAV contents data provided from the contents providing CP server 300, i.e., data files of characters, animations, or dubbed audio related to the main A/V stream read from the interactive DVD 10. The buffer memory 14 may be organized into a first buffer and a second buffer.

The ENAV engine included in the IDVD system 12 outputs the main A/V stream data read from the interactive DVD 10 in synchronization with the ENAV contents data read from the interactive DVD 10 or provided from the contents providing CP server 300.

Figure 2A:
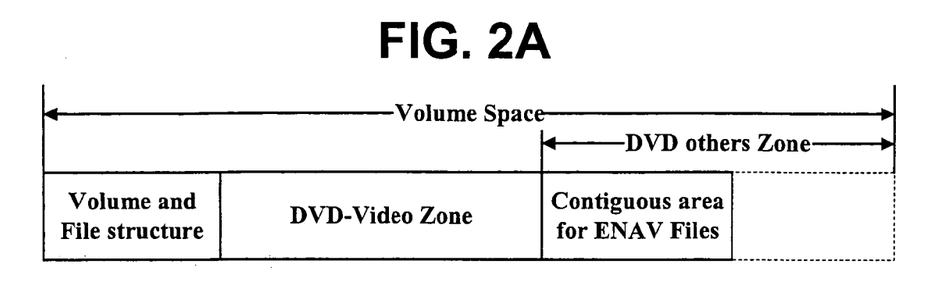
FIGS. 2A and 2B illustrate the directories and file structure of an exemplary interactive optical disk 10 according to the preferred embodiment.
Figure 2B:
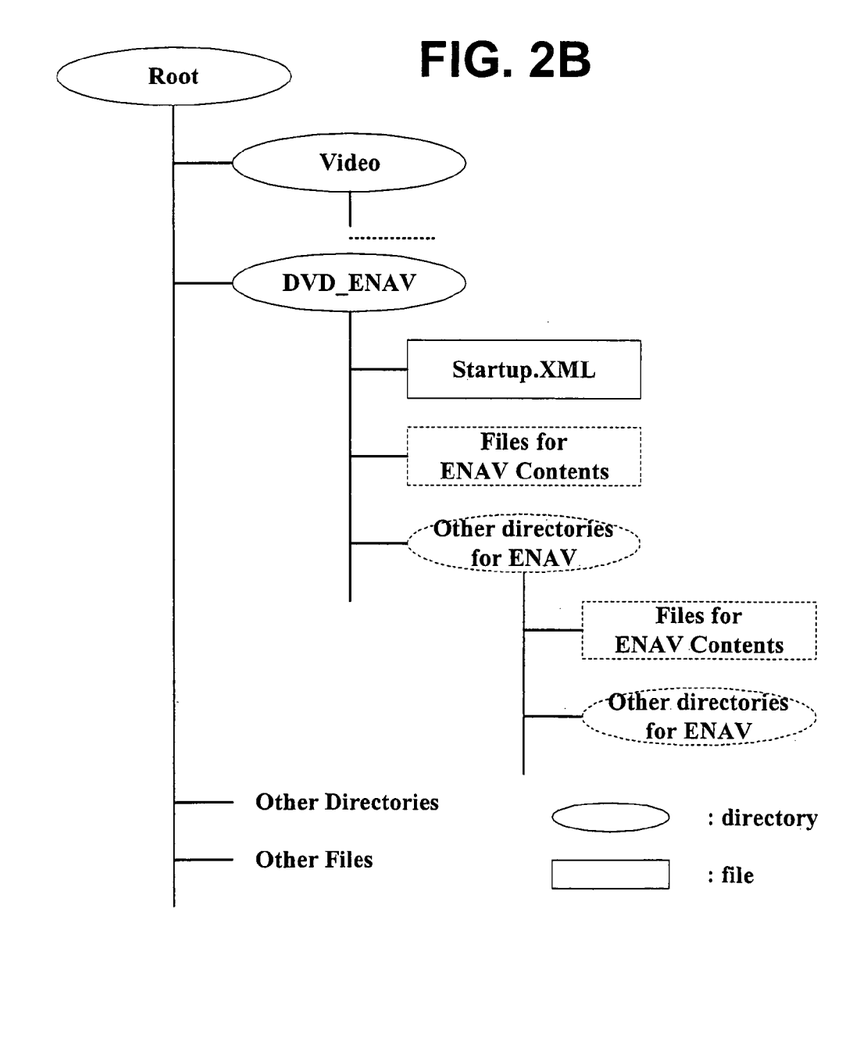

As shown in FIG. 2A, an interactive DVD comprises a DVD video zone storing main A/V stream data and another zone for storing ENAV applications data related to the main A/V stream data. As shown in FIG. 2B, the file structure of the interactive DVD includes a root directory containing a Video directory in which A/V streams are stored and a DVD_ENAV directory in which information about ENAV contents is stored. The DVD_ENAV directory stores a startup file (Startup.XML), loading information files containing control information required for playback of ENAV applications, a walled garden list file (hereinafter referred to as walled garden list) containing information on addresses of servers having contents data needed for the ENAV applications, and contents data files required for the ENAV applications.

Figure 3A:
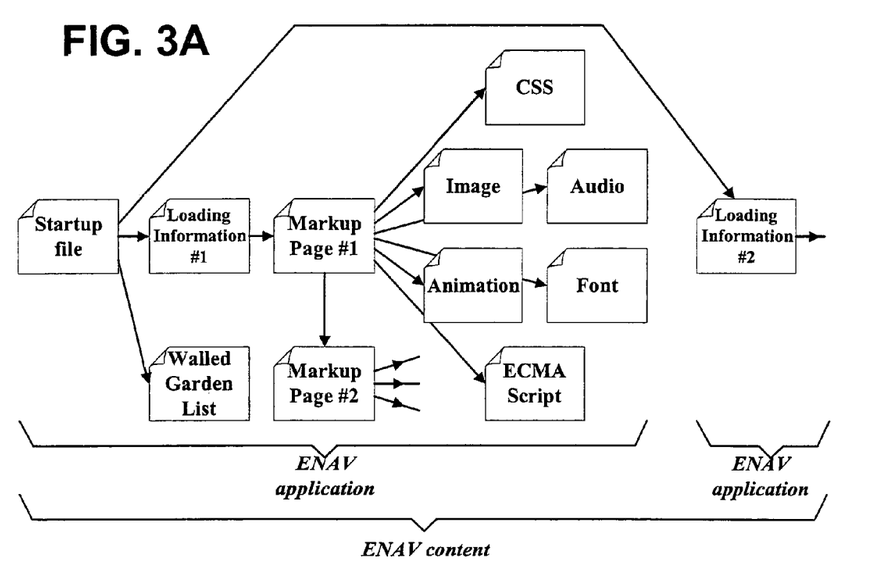
FIGS. 3A and 3B illustrate the exemplary structure of ENAV contents for the interactive optical disk in accordance with one or more embodiments.
Figure 3B:
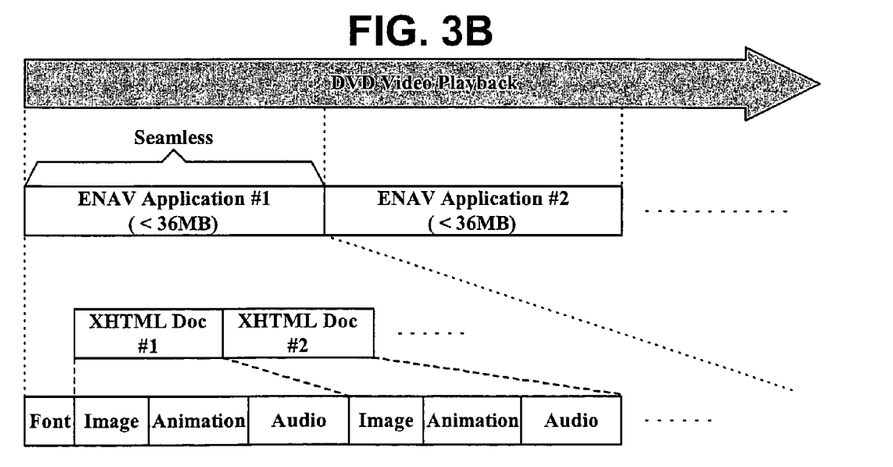

As shown in FIG. 3A, ENAV contents data comprises a plurality of ENAV applications. As shown in FIG. 3B, an ENAV application provides additional information corresponding to an interval of the main A/V stream reproduced from the optical disk. A corresponding loading information file manages one ENAV application. The loading information file provides information on the corresponding ENAV application to the interactive optical disk 10 reproducing apparatus 100, thereby allowing the optical disk reproducing apparatus 100 to form the structure in the ENAV buffer 14 and to load the ENAV buffer 14 with ENAV contents data needed for the corresponding ENAV application.

In addition, the loading information file contains the location of ENAV contents data needed for the corresponding ENAV application in the form of a URI. If ENAV contents data required for the corresponding ENAV application is recorded on the optical disk, the information on the location will be of the form 'file://dvdrom:/DVD_ENAV/stream1.ac3'. If ENAV contents data required for the corresponding ENAV application is to be provided from a remote server, the information will be of the form 'http://website/audio/stream2.ac3'. 'Image', 'Audio', 'Animation', and 'Font' shown in FIG. 3B are the ENAV contents data, for example.

The term walled garden in the walled garden list shown in FIG. 3A means an environment that manages the range of access to contents or services stored in the web. The walled garden is expressed in terms of a list of all accessible URIs in the preferred embodiment. In other words, the walled garden list is a list of sites that are accessible and/or not accessible to the ENAV DVD.

The startup file (Startup.XML) shown in FIG. 3A comprises startup information such as links to the loading information files and the walled garden list. The startup procedure uses 3 types of files, the startup file, walled garden list file, and loading information files. The ENAV engine prepares for the reproduction of the first ENAV application using the three files.

The procedure for reproducing ENAV applications will now be described. With reference to accessible servers listed in the walled garden list file linked by the startup file, the ENAV engine reads and interprets the loading information file managing an ENAV application to be reproduced, which is also linked by the startup file, and transmits the loading information to the buffer manager. The buffer manager reads resources for reproducing the ENAV application, i.e., the contents data, from the disk or a CP server 300 and loads the contents data into the buffer, which finishes the preparations for the reproduction of the ENAV application. If the reproduction of the ENAV application is completed, the above process is repeated for a next ENAV application to be reproduced.

Figure 4A:
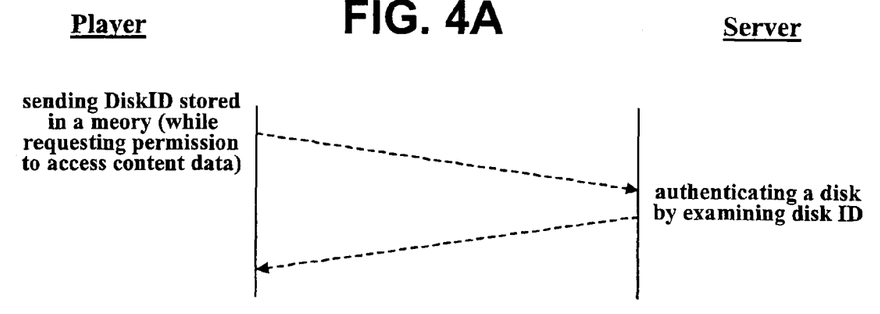
FIGS. 4A, 4B and 4C illustrate flow diagrams related to a method for authenticating an interactive optical disk, in accordance with various embodiments of the present invention.
Figure 4B:
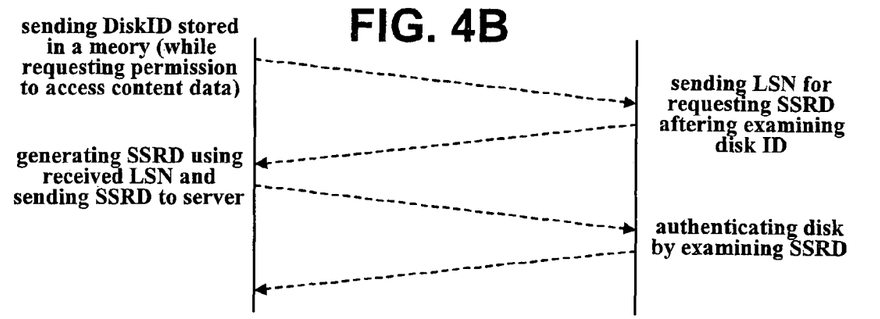
Figure 4C:
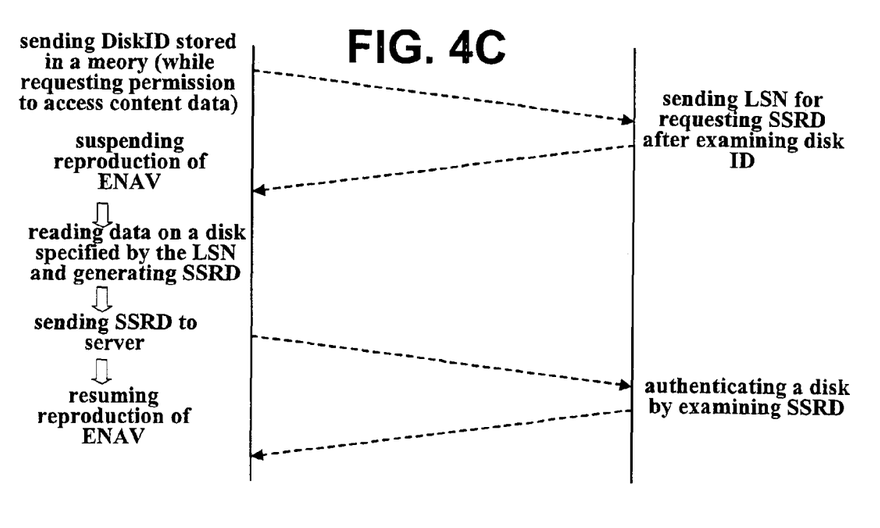

Referring to FIGS. 4A to 4C, an exemplary preferred method for authenticating an interactive optical disk 10 in accordance with the present invention is provided. The reproduction of the main A/V stream or an ENAV application of an interactive optical disk 10 begins when the interactive optical disk 10 has been loaded. The disk authentication operation is conducted between an interactive optical disk player 100 that will play the optical disk 10 and a CP server 300 in the case where the disk player 100 needs to connect to the CP server 300 to obtain contents data required for the reproduction of ENAV applications recorded on the interactive optical disk 10.

FIG. 4A illustrates the case in which the CP server 300 only requests the disk ID as authentication data. FIGS. 4B and 4C illustrate the case in which the CP server 300 requests the SSRD as authentication data. Also, the steps in FIG. 4B are executed before the reproduction of the main A/V stream or ENAV applications begins and the steps in FIG. 4C are executed during the reproduction of the main A/V stream or an ENAV application, in which case the CP server 300 requests the SSRD as authentication data and thus the reproduction of the main A/V stream or the ENAV application is temporarily suspended.

If an interactive optical disk 10 (for example, IDVD or ENAV DVD) 10 is inserted, the optical disk player or reproducing apparatus 100 reads the ENAV DiskID from the disk 10 and stores it in a memory. If the disk has the DVD_ENAV directory as shown in FIG. 2B, the reproducing apparatus 100 prepares the reproduction of ENAV applications by reading the startup file (for example, Startup.XML) and the walled garden list file and loading information files linked by the startup file. As mentioned above, the walled garden list comprises a list of CP servers 300 that are accessible or not accessible to the interactive optical disk 10. The loading information file corresponding to each ENAV application comprises information for managing the corresponding ENAV application and provides the position information of contents data required for the reproduction of the corresponding ENAV application in the form of URIs.

The ENAV DiskID is data needed for authentication of the optical disk 10 in the case where contents data required for the reproduction of ENAV applications recorded thereon resides in a remote CP server 300. Once the optical disk reproducing apparatus 100 stores the ENAV DiskID in a memory, it is not necessary for the reproducing apparatus 100 to stop the reproduction of the main A/V stream or ENAV applications in order to read the ENAV DiskID from the optical disk. The ENAV DiskID may be stored in one embodiment in a private memory area, for example. In one embodiment, the Disk ID may be stored as a cookie, in a memory of the reproducing apparatus 100. The private memory area is set to be not accessible to other application programs. The stored ENAV DiskID is kept valid until the disk is unloaded or the stored value is deleted.

The server information included in the walled garden list or the position information of contents data included in the loading information files may additionally include authentication attribute information about authentication data required when the reproducing apparatus 100 accesses contents data required for the reproduction of the ENAV applications. The value of the authentication attribute may be set to at least one of 'None', 'DiskID', or 'SSRD', for example. The reproducing apparatus 100, therefore, is notified of the type of authentication data requested when accessing CP server 300 or URIs for obtaining contents data necessary for the reproduction of the ENAV applications.

If the value of the authentication attribute is 'None', for example, the corresponding CP server 300 will request no authentication data. If the value is 'DiskID', for example, the corresponding CP server 300 will request the ID of the disk. If the value is 'SSRD', for example, the corresponding CP server 300 will send a logic sector number or LSN to the reproducing apparatus 100 and will request not only the disk ID but the SSRD corresponding to the LSN. If an SSRD is requested, the reproducing apparatus 100 moves the optical pickup 11 to a predetermined disk area or sector corresponding to the LSN and reads data of a predetermined size (e.g., 2048 bytes).

In one embodiment, the SSRD is created from raw data. If the authentication attribute is not included in the server information included in the walled garden list or address information of contents data included in the loading information files, the CP server 300 or the server managing the addresses of contents data may not request the authentication process. However, this does not imply the omission of the authentication process because the authentication attribute is not yet specified as mandatory in the disk format.

The authentication process begins, when the CP server 300 or the server managing the URIs determines that the authentication process is successful, then the reproducing apparatus 100 may access CP server 300 or URIs for obtaining contents data required for the reproduction of ENAV applications. The authentication process is initiated when the reproducing apparatus 100 attempts to access one or more servers listed in the walled garden list or at least one URI listed in the loading information files corresponding to ENAV applications to obtain authentication in advance as a part of initialization steps to reproduce the inserted disk.

If the authentication procedure is conducted as a part of the initialization steps and is skipped afterwards, the reproducing apparatus 100 does not stop the current reproduction of the main A/V stream or the ENAV application to get authentication. If the authentication is allowed when the reproducing apparatus 100 accesses a CP server 300 or a URI to obtain contents data, the reproducing apparatus 100 connects to the CP server 300 or URI to obtain the contents data required for the reproduction of a next ENAV application and perform the authentication procedure during the reproduction of the main A/V stream.

If an initial authentication is successful against a first CP server 300, the authentication procedure may be skipped when the reproducing apparatus 100 attempts to access another CP server 300 or a URI to obtain contents data required for the reproduction of an ENAV application; particularly when the URI is managed by a server that manages another CP server or URI that has performed the authentication procedure before. In one embodiment, when the authentication is performed against a URI, the authentication procedure can be skipped when the same URI is accessed more than once and should be performed in other cases.

Authentication related data (e.g., when to perform the authentication, the type of data required for the authentication, and authentication unit) is determined by CP servers 300. In accordance with one embodiment, an effective method for performing the authentication process with seamlessly reproducing the main A/V stream or ENAV applications of the inserted disk is provided.

When authentication attribute information is added to the position information for contents data included in the loading information files or server information included in the walled garden list, the value of the authentication attribute may be set to one of 'None', 'DiskID', and 'SSRD'. The authentication attribute may be recorded for each CP server 300 listed in the walled garden list or for each URI included in the loading information files.

First, the case in which the authentication attribute is recorded for each CP server 300 in the walled garden list is considered.

The authentication method in this case is performed when an interactive optical disk 10 is loaded into a reproducing apparatus 100 and comprises a first step of reading the walled garden list file for accessing contents data required for the reproduction of ENAV applications recorded thereon and a second step of performing an authentication procedure with all CP servers 300 listed in the walled garden list file according to authentication attribute information included therein.

In one embodiment, the second step may be skipped if the authentication process is allowed also when the reproducing apparatus 100 attempts to access all CP servers 300 listed in the walled garden list to obtain authentication in advance as a part of the initialization steps to play the inserted disk 10 and the reproducing apparatus 100 accesses a CP server 300 listed in the walled garden list (or the same HTTP session) again afterwards to obtain required contents data.

If the authentication attribute is 'DiskID', the second step comprises the steps of sending from the reproducing apparatus 100 the stored disk ID to the CP server 300 and authenticating the interactive disk 10 at the CP server 300 by examining the disk ID. If the authentication attribute is 'SSRD', the second step comprises the steps of sending from the reproducing apparatus 100 the stored disk ID to the CP server 300, sending from the CP server 300 an LSN to the reproducing apparatus 100 with a request for an SSRD corresponding to the LSN, obtaining the requested SSRD data represented by the LSN at the reproducing apparatus 100, sending the SSRD to the CP server 300, and authenticating the interactive disk 10 at the CP server 300 by examining the SSRD data.

The authentication process of the second step may be allowed when the reproducing apparatus 100 connects to a CP server 300 listed in the walled garden list to obtain contents data required for the reproduction of ENAV applications. In this case, the authentication method comprises a first step of reading the disk ID of the interactive optical disk 10, storing the disk ID in memory, and reading the walled garden list file for accessing contents data required for the reproduction of ENAV applications recorded thereon, and a second step of performing an authentication procedure according to the authentication attribute included in the walled garden list file, when the reproducing apparatus 100 connects to a CP server 300 listed in the walled garden list to obtain required contents.

If the authentication attribute is 'DiskID', it is not necessary to stop the reproduction of the current main A/V stream or ENAV application to perform the authentication process because the disk ID is stored in the memory. In other words, the second step comprises the steps of sending from the reproducing apparatus 100 the stored disk ID to CP server 300 to request permission to access contents data required for the reproduction of an ENAV application and authenticating the interactive disk 10 at the CP server 300 receiving the disk ID.

If the authentication attribute is 'SSRD', the second step comprises the steps of sending from the reproducing apparatus 100 the stored disk ID to the CP server 300 to request permission to access required contents data, sending an LSN from the CP server 300 to the reproducing apparatus 100 with a request for an SSRD corresponding to the LSN, reading the requested SSRD after suspending the reproduction of the current main A/V stream or ENAV application, sending the SSRD to the CP server 300, and authenticating the interactive disk 10 at the CP server 300.

In one embodiment, the second step may be skipped if a server having contents data required for the reproduction of an ENAV application has already performed the authentication process for other ENAV applications.

In this case the authentication method performed when an interactive optical disk 10 is loaded into the reproducing apparatus 100 comprises a first step of reading loading information files for obtaining contents data required for the reproduction of ENAV applications recorded thereon, and a second step of performing an authentication procedure according to the authentication attribute information included in the loading information files.

The second step is a part of the initialization steps conducted after the disk 10 is inserted and the authentication process is allowed when the reproducing apparatus 100 attempts to access URIs of contents data included in the loading information files for obtaining authentication. The second step may be skipped afterwards when the reproducing apparatus 100 accesses one of the URIs to obtain required contents data.

If the value of the authentication attribute is 'DiskID', the second step comprises the steps of sending from the reproducing apparatus 100 the stored disk ID to a server that manages a URI to and authenticating the interactive disk 10 by examining the disk ID.

If the value of the authentication attribute is 'SSRD', the second step comprises the steps of sending the disk 10 from the reproducing apparatus 100 to a CP server 300 that manages a URI, sending from the CP server 300 an LSN to the reproducing apparatus 100 requesting an SSRD corresponding to the LSN, reading the requested SSRD data according to the LSN at the reproducing apparatus 100, sending the SSRD to the CP server 300, and authenticating the interactive disk 10 at the CP server 300 by examining the SSRD data.

The authentication process of the second step may be allowed when the reproducing apparatus 100 connects to a URI to obtain contents data required for the reproduction of ENAV applications. In this case, the authentication method comprises a first step of reading the disk ID of the interactive optical disk 10 inserted into the reproducing apparatus 100, storing the disk ID in a memory, and reading loading information files for accessing contents data required for the reproduction of ENAV applications recorded on the interactive optical disk 10.

A second step of performing an authentication procedure according to authentication attribute information is included in the loading information files when the reproducing apparatus 100 attempts to access the URIs included in the loading information files to obtain contents data required for the reproduction of the ENAV applications.

If the value of the authentication attribute is 'DiskID', the second step comprises the steps of sending from the reproducing apparatus 100 the stored disk ID to a CP server 300 that manages a URI to connect to for requesting permission to access contents data required for the reproduction of the ENAV applications and authenticating the interactive disk 10 at the CP server 300 by examining the disk ID.

If the value of the authentication attribute is 'SSRD', the second step comprises the steps of sending from the reproducing apparatus 100 the stored disk to a CP server 300 that manages a URI, sending from the CP server 300 an LSN to the reproducing apparatus 100 requesting an SSRD, suspending the reproduction of a current A/V data or ENAV application, reading the requested SSRD data located at the LSN, sending the SSRD to the server, resuming the suspended reproduction, and authenticating the interactive disk 10 at the CP server 300 by examining the SSRD data.

In one embodiment, the second step may be skipped if the reproducing apparatus 100 attempts to connect to a URI to obtain contents data for the reproduction of an ENAV application and the URI has performed the authentication process for the same ENAV applications before.

The method for authenticating an interactive optical disk 10 in accordance with the present invention allows a stable and seamless reproduction of the main A/V stream or ENAV applications under any authentication condition.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teachings can be readily applied to other types of methods and systems. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for authenticating an interactive storage medium, wherein a first content is stored on the interactive storage medium for reproduction by a reproducing system, the method comprising:
checking authentication attribute information from the interactive storage medium;
transmitting, by the reproduction system, a first request to a content server to access a second content from the content server by providing a first authentication data for authentication in response to the authentication attribute information, the first authentication data being an ID of the interactive storage medium;
receiving, by the reproduction system, return information generated by the content server in response to the first authentication data provided by the reproducing system for requesting the reproducing system to provide a second authentication data for the authentication; and
receiving, by the reproduction system, the second content from the content server when the authentication is successful,
wherein receiving of the return information comprises receiving a challenge for requesting the reproducing system to provide the second authentication data for the authentication, the challenge comprising an address in the interactive storage medium, and
wherein the reproduction of the first content is suspended during the authentication depending on a value of the checked authentication attribute information.

2. The method of claim 1, further comprising loading the first authentication data in a memory of the reproducing system,
wherein the first authentication data is recorded on the interactive storage medium.

3. The method of claim 2, wherein the loading of the first authentication data in the memory of the reproducing system occurs prior to the transmitting of the first request to avoid delay.

4. The method of claim 2, wherein the first authentication data is communicated as a cookie.

5. The method of claim 1, further comprising discontinuing reproducing the first content, if the authentication is unsuccessful.

6. The method of claim 1, wherein the first content comprises audiovisual data.

7. The method of claim 1, wherein the challenge comprises a logic sector number.

8. The method of claim 7, wherein the logic sector number is associated with a data stored on the interactive storage medium and used to generate the second authentication data.

9. The method of claim 1, wherein the challenge is generated as a cookie.

10. The method of claim 1, further comprising retrieving an additional identifying data from the interactive storage medium based on information included in the challenge.

11. The method of claim 10, further comprising:
converting the additional identifying data to the second authentication data based on a predetermined function; and
forwarding the second authentication data to the content server.

12. The method of claim 11, further comprising forwarding the second authentication data to the content server for authentication.

13. The method of claim 12, wherein the content server verifies the second authentication data against database records to determine whether the interactive storage medium is authentic.

14. The method of claim 13, wherein the content server authorizes the reproducing system to access the second content, when the content server verifies the second authentication data.

15. The method of claim 13, wherein the reproducing system discontinues producing the first content, until the content server verifies the second authentication data.

16. The method of claim 1, wherein the authentication is performed for each content server accessed by the reproducing system.

17. The method of claim 1, wherein the authentication is performed for each content file recorded on the interactive storage medium, at time of reproduction.

18. The method of claim 1, wherein the authentication is not performed, when the first request comprises a first indicator indicating that authentication is not required.

19. The method of claim 1, wherein the authentication is performed based on the first authentication data stored on the interactive storage medium player, when the first request comprises a second indicator indicating that authentication is required.

20. The method of claim 1, wherein the authentication is performed based on a second authentication data calculated based on information provided by the content server, when the first request comprises a third indicator indicating that authentication is required.

21. The method of claim 1, wherein, when the authentication is successful, then the authentication is no longer performed when the reproducing system requests access to the second content stored on content servers listed in a list of content providers.

22. The method of claim 1, wherein, when the authentication is successful, then the authentication is no longer performed when the reproducing system requests access to the second content accessible through an identified uniform resource locator.

23. A reproduction system for authenticating a storage medium, the reproduction system comprising:
a pickup device configured to read content data, authentication attribute information and first authentication data stored in the storage medium;
an engine device configured to reproduce the content data from the storage medium;
a controller in communication with and configured to control the engine device; and
an interface device controlled by the controller to communicate with a content server,
wherein the reproduction system is configured to
transmit the first authentication data to the content server through the interface device for authentication in response to the authentication attribute information, the first authentication data being an ID of the storage medium,
receive return information including a challenge generated by the content server in response to the first authentication data for requesting the reproducing system to provide a second authentication data for the authentication, the challenge comprising an address in the storage medium, and
receive a second content from the content server when the authentication is successful, and
wherein the engine device is controlled to suspend reproduction of the first content during the authentication depending on a value of the authentication attribute information.

24. The apparatus of claim 23, wherein the controller is further configured to retrieve an additional identifying data from the storage medium based on information included in the challenge.

25. The apparatus of claim 24, wherein the reproduction system is further configured to convert the additional identifying data to the second authentication data based on a predetermined function and forward the second authentication data to the content server.

26. The apparatus of claim 25, wherein the reproduction system is further configured to forward the second authentication data to the content server for the authentication.

27. The apparatus of claim 26, wherein the content server is configured to verify the second authentication data against database records to determine whether the storage medium is authentic.

28. The apparatus of claim 27, wherein the content server is configured to authorize the reproducing system to access the second content, when the content server verifies the second authentication data.

29. The apparatus of claim 23, wherein the challenge comprises a logic sector number, the logic sector number being associated with a data stored on the storage medium and used to generate the second authentication data.

* * * * *